Oct. 4, 1938. J. H. THORNBERY ET AL 2,132,057
THERMOELECTRIC SAFETY SWITCH
Filed April 4, 1935 2 Sheets-Sheet 2
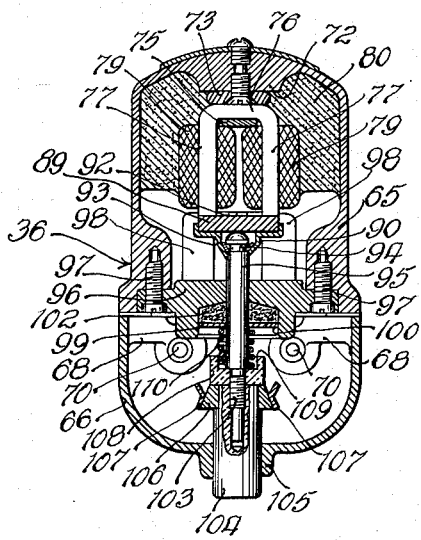
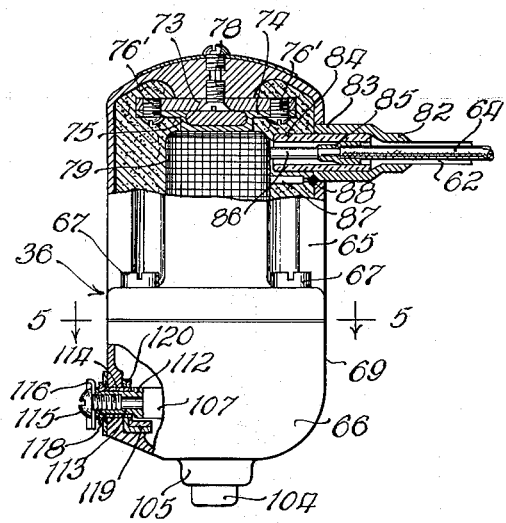
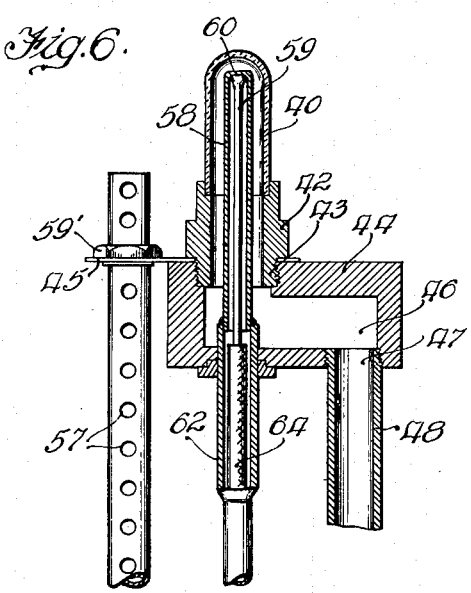
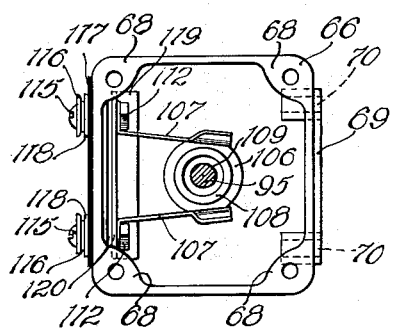
Inventors:
John H. Thornbery
Harold A. Mantz Patented Oct. 4, 1938

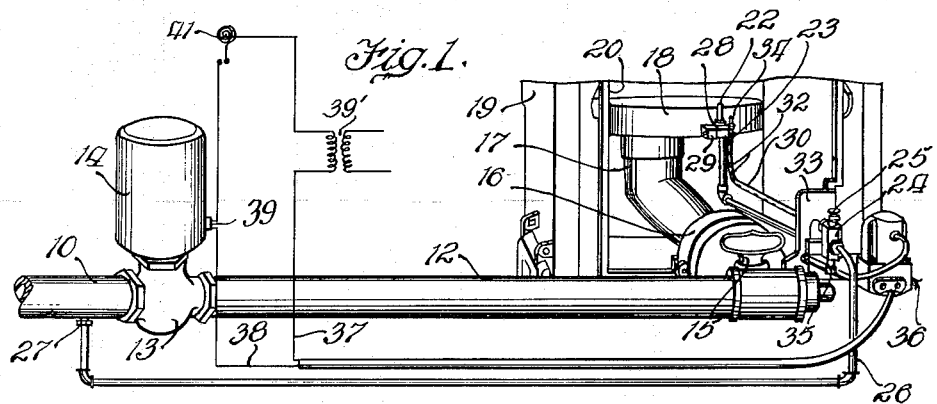

2,132,057

UNITED STATES PATENT OFFICE 2,132,057

THERMO-ELECTRIC SAFETY SWITCH

John H. Thornbery and Harold A. Mantz, Milwaukee, Wis., assignors to Milwaukee Gas Specialty Company, Milwaukee, Wis., a corporation of Wisconsin Application April 4, 1935, Serial No. 14,551

3 Claims. (Cl. 200—87)

This invention relates to thermo-electric safety switches and more particularly is directed to a combination pilot and safety switch unit for use with hot water heaters, conversion burners, gas furnaces, automatic space heaters, domestic gas ranges and the like.

In safety pilots and associated shut-off valves or switch mechanism, it has been customary to provide heat responsive means for shutting off the main fuel supply line comprising bimetal thermostat strips, differential expansion devices, liquid-in-bulb expansion devices, or similar thermally sensitive actuating means responsive to the heat of the pilot flame for controlling operation of a gas valve in a fuel supply conduit. Extinguishment of the flame would result in cooling of the heat-sensitive means, and this in turn would result in closing of the gas valve. Such elements produce a considerable time lag in the operation of the valve.

The present invention, in its preferred embodiment utilizes a thermocouple and electro-magnet as the actuating means responsive to the heat of the pilot flame for controlling operation of a remotely disposed safety valve. The dependability of a thermocouple for producing a steady, reliable electric current has been availed of industrially for control of exact processes, or for heat measuring means, but the application of this principle in connection with a safety pilot shut-off valve independently of house current or auxiliary batteries produces an extremely efficient and accurate heat responsive means for control purposes.

The thermocouple employed in the present structure is so constructed as to develop a fairly intensive current within a short interval of time when subjected to the heat of a pilot flame, and ceases to produce current almost immediately after the flame is extinguished, thus providing a quick-acting positive control device.

Further, the flexibility of connection of the thermocouple to a suitable control valve or safety switch permits its installation in practically any desired position, and its connections can be carried over and under projections and around corners in a manner not possible with the usual type of heat responsive means. There is no rigidity or predetermined alinement to maintain, no moving parts producing wear or maladjustment, and the entire unit is relatively simple to install and connect for operation.

A further feature of the present invention is the use of a thermocouple having an enclosed and protected hot juncture, the outer element being highly resistant to deterioration by heating. The two conductors consist of an insulated wire within a copper tube which tube itself forms one conductor.

Another object of the present invention is to provide a safety unit of this type for lighting a burner disposed in a relatively remote and inaccessible portion of a furnace or heater construction. The thermocouple junction may be carried within the ignition pilot, which preferably is of the type shown in the patent to Harold A. Mantz, No. 1,983,863, issued December 11, 1934, comprising a porous refractory pilot tip which is gum-proof and wind-proof, and burns any type of combustible gas without changes or air adjustments. By placing the hot junction directly in the pilot tip, it is responsive only to the heat of the pilot flame. This eliminates the usual connecting pilots, thermostatic pilots, and their adjustment. No adjustment upon installation is required, and no moving parts are placed in the combustion chamber with the present construction.

A further object of the present invention is the provision of a unit having an external push-button type lighter, which permits ignition of the main pilot from outside of the furnace, the lighter being capable of igniting a main pilot three or four feet distant, which may ordinarily be inaccessible from outside the furnace. This auxiliary lighter will turn corners to light such inaccessible main pilots.

Another object of the present invention is to provide a unit comprising a pilot, a safety switch and thermocouple control therefor responsive to the pilot flame, and an external lighter, which is adapted for installation in almost all types of present burner or furnace constructions, and which is flexible and easy to install.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 1 is a somewhat diagrammatic elevational view of a gas burner embodying one form of the present invention;

Figure 2 is a perspective view of the main pilot and safety control switch forming the safety unit of the present invention;

Figure 3 is a vertical sectional view through the safety switch;

Figure 4 is an elevational view, partly in section, taken at substantially right angles to the structure shown in Figure 3;

Figure 5 is a horizontal sectional view taken substantially on line 5—5 of Figure 4; and Figure 6 is an enlarged sectional view through the main pilot tip and associated structure.

Referring now in detail to Figure 1, I have shown a fuel supply conduit 10, communicating with the manifold 12 through a safety control valve 13, which, in this embodiment of the invention, comprises an electrically operated valve having actuating mechanism disposed within the housing 14 mounted upon the valve body. A manually operable shut-off valve or cock 15 controls the flow of fuel from the manifold 12 into the mixing chamber 16 of the burner, the gas and air mixture from the mixing chamber 16 passing through the conduit 17 to the burner 18. The burner 18 is disposed within a suitable furnace base or housing 19, which is provided with the opening or door 20, preferably disposed at the front of the furnace, and providing suitable means for mounting the mixing chamber 16 and burner in fixed position within the furnace structure.

A pilot tip 22, preferably of the type described in the above referred to Mantz patent, and comprising a porous refractory material, is supplied with gas through the pilot conduit 23 leading to a suitable control valve 24 having a push button 25 carried thereby, the valve 24 communicating through conduit 26 with the main fuel supply line 10, which conduit 26 is tapped thereinto as indicated at 27.

The pilot tip 22 is mounted on a suitable housing 28, which is supported on bracket 29 carried by the side wall of the burner 18. In order to ignite the pilot tip 22, a lighter conduit 30, provided with a plurality of spaced openings 32 in the under surface thereof, communicates with the upper portion of the valve body 24, and upon depression of the push button 25, gas from the conduit 26 enters the conduit 30. By applying a match or other similar igniting member in front of the plate 33, the gas will be ignited at the port immediately adjacent this plate, and will travel along the spaced openings 32, providing a traveling lighting flame which terminates at the tip 34 supported adjacent the main pilot tip 22, whereby the fuel admitted to the main pilot tip 22 and issuing through the pores thereof will be ignited. After the main pilot tip has been ignited, the push button 25 is released, and fuel is shut off from the conduit 30, thereby extinguishing the pilot flame at the openings 32.

This provides a means for igniting a main pilot disposed within a furnace or other heater construction, which is inaccessible from outside of the furnace, by means of a traveling lighting flame which is controlled from outside of the furnace, and which may be extinguished upon ignition of the main pilot.

It is apparent that the conduit 30 might be bent into any desired shape to pass around corners or projections for reaching the main pilot tip 22, and consequently we have provided a means for igniting the main pilot tip from a point remote therefrom, which insures positive ignition of the main tip, and at the same time does not necessitate a constantly operating traveling or trailer burner. The valve body 24 is so constructed as to provide for a metered flow of fuel to the main pilot tip 22, this flow being metered by the metering valve screw 35 threading into the base of the valve body 24, while depression of the push button 25 results in an increased flow of gas through the valve body 24 and into the conduit 30 for establishing a flow of gas which may be ignited to produce ignition of the main pilot burner 22.

Mounted upon the outside of the furnace 19 is a suitable bracket for supporting a safety switch indicated generally at 36, and which will be described in detail hereinafter. This switch is connected, through conductors 37 and 38, to suitable terminals 39 carried by the electrically controlled actuating mechanism within the housing 14 carried by the valve 13. The conductor 37 includes a secondary winding of a transformer 39', connected to a suitable source of current, and then extends through a room thermostat 41, or other temperature control means, to the terminal 39. Thus, as long as the pilot tip is ignited, the operation of valve 13 will be controlled by the thermostat 41, opening the valve when heat is required, and closing the valve when the enclosure or other space is sufficiently heated. Upon extinguishment of the pilot flame, however, the valve will close independently of thermostat 41.

If desired, the member 36 may be designed as a direct valve operating structure, wherein a valve member is carried in the lower portion thereof, instead of the switch contact. Such a structure is shown and described in our copending application, Serial No. 743,332, filed September 10, 1934, in which case the safety switch structure 36 is mounted directly in the gas manifold conduit 12 and controls flow of fuel therethrough.

Considering now in detail the structure shown in Figure 2, we have disclosed a unitary construction comprising a main pilot tip, a fuel supply control valve therefor, an auxiliary lighting conduit for the tip, and a thermocouple carried by the main pilot tip for controlling a suitable switch mechanism which, in turn, controls a remotely disposed safety valve. This unit is adapted for installation in existing furnace and heater constructions, and may be employed in any construction wherein the main pilot tip is to be disposed in a relatively inaccessible position within a furnace, space heater, or other similar equipment.

In the embodiment of the invention disclosed in Figure 2, the main pilot tip is indicated at 40, and is carried upon a suitable bushing 42 in any desired manner, as shown in detail in Figure 6. The tip 40 comprises an inverted cup-shaped porous tip member which is sealed, cemented or otherwise suitably secured in the upper end of the bushing 42, the bushing being provided with a lower threaded portion 43 adapted to thread into a suitable housing member 44, there being a bracket member 45 secured between the bushing and the housing member 44 and providing a supporting projection extending outwardly of the body or housing 44. The interior of the pilot tip is connected through the bushing 42 and the gas chamber 46 of the housing 44 to the outlet end 47 of a fuel supply conduit 48 threading into the housing in the manner shown in Figure 6. The conduit 48 communicates, through elbow 49 and conduit 50, with the valve body 52, corresponding to the valve body 24 of Figure 1.

A suitable pilot fuel supply conduit leading from a gas supply line or the like, indicated at 53, is threaded into the valve body 52 by means of bushing 54, and the fuel supply to the conduit 50, and consequently to the pilot tip 40, is controlled by an adjustable metering screw 55 threading into the lower end of the valve body and controlling the flow of fuel through the valve body to the conduit 50. Similarly, a lighter conduit 56 is connected with the valve body 52, and is adapted to receive fuel from the conduit 53 when the push button 58' is depressed, whereby fuel is admitted to the interior of the conduit 56, and passes outwardly therefrom through the openings 57 formed in the upper surface of this conduit. The outer end of the conduit 56 is supported, by means of the nut member 59' in the extending portion of the bracket 45, as shown in Figure 6, and the openings 57 thereby provide for travel of a lighting flame from the valve body 52 along the conduit 56 up to a point adjacent to the pilot tip 40. This results in the ignition of the gas issuing through the pores of the pilot tip 40, resulting in ignition of the pilot tip at a point not readily accessible from outside of the furnace.

A suitable thermocouple, comprising an outer protecting tubular element 58, which at one end is welded to the inner element 59, as shown at 60, for the purpose of providing a hot welded junction between the two members, is disposed within the bushing 42 in the interior of the pilot tip 40. The hot junction is thus disposed within the pilot tip and subjected only to the heat of the pilot flame, not being affected by drafts or wind pressure. The member 58 extends downwardly into the chamber 46 of the housing 44, and is there joined, as by welding or the like, to a suitable metallic tube 62, which tube extends through the mounting plate 63 carrying the safety switch 36, which is similar to the switch 36 described in Figure 1. The copper tube 62 is provided with suitable means for enclosing an insulated conductor 64 which is connected to the inner member 59 enclosed within the outer member 58 of the thermocouple. The members 58 and 59 are formed of dissimilar metals, such as constantan and chromel, or other metals which, when heated at a junction therebetween, are adapted to produce an electric current.

In the particular embodiment of the invention shown, the heat produced within the pilot tip 40 is sufficient to heat up the thermocouple junction, so that within a half minute, for example, after the pilot tip 40 has been ignited, the thermocouple junction will become sufficiently heated to generate a current of substantially one ampere through the conductors 62 and 64.

Referring now in detail to the specific construction of the safety switch 36, reference should be made to Figures 3, 4 and 5, which illustrate the internal construction of this member.

The safety switch 36 comprises an upper housing member 65, which is suitably secured to the lower switch housing member 66 by means of a plurality of cap screws 67 threaded into the inwardly extending corner 68 of the housing 66.

The lower housing 66 is provided with a laterally offset boss 69, having a pair of spaced openings 70 extending from the external surface of the boss 69 into the interior of the housing. These openings 70 are for the purpose of receiving suitable attaching members or the like for securing the switch 36 in position upon a supporting surface, such as the plates 33 or 63 shown in Figures 1 and 2.

The upper housing 65 of the member 36 is provided with a central inwardly extending boss portion 72, which is adapted to form a flat supporting surface receiving a suitable supporting bracket 73 to which is clamped a second bracket 74 having a downwardly offset portion 75 forming a spaced rectangular opening between the lower surface of the bracket 73 and the offset portion 75. This opening is adapted to receive the base portion 76 of a U-shaped magnet having legs 77, the base being clamped between the brackets 74 and 73 by means of the clamping screw members 76' shown in Figure 4. The magnet is preferably formed of a special alloy which is non-corrosive and has a high degree of permeability with minimum retentivity. The bracket 73 is secured to the depending boss 72 by means of a countersunk screw member 78.

The downwardly extending legs 77 of the magnet are each provided with an energizing coil 79, and the entire bracket assembly and coils are secured in position by means of suitable cementing material 80 poured into the upper end of the housing 65 and set in position about the coils 79 and the bracket supporting means 73 and 74.

The conductor 62, comprising a copper tube, is secured, at its end, within a reduced portion 82 of a bushing 83 extending into and electrically contacting the housing 65. Within the bushing 83 is provided an insulating sleeve 84 extending about the inner end of the conductor 64, and enclosing the connection indicated at 85 between the conductor 64 and the terminal conductor 86 of one of the coils 79. The other terminal 87 of the coils 79 is connected to the bushing 83 as shown at 88. Thus a circuit is completed between the coils 79 about the legs 77 of the magnet and the conductors 62 and 64 leading to the hot thermocouple junction disposed within the pilot tip 40.

A suitable armature 89, preferably formed of a special alloy which is non-corrosive, and a high degree of permeability, with minimum retentivity of magnetism, is provided for the magnet 76. The armature 89 is securely held by the carrier member 90, the upwardly projecting portions of the carrier member being bent over, as shown at 92 in Figure 3, to secure the armature in position.

The lower end of the carrier member 90 is provided with a downwardly and inwardly offset portion 93, which is adapted to have substantially universal movement about an annular groove 94 formed in a reciprocatory stem member 95. This stem member 95 has axial reciprocatory movement within a guide member 96, which guide member 96 is suitably secured to inwardly projecting rib portions of the housing 65 by means of countersunk cap screws 97.

The guide member 96 is also provided with upwardly extending guide portions or arms 98 which serve to guide the reciprocatory movement of the armature 89 so that it will be guided for movement against the ends of the legs 77 of the magnet. The lower end of the stem member 95 is adapted to pass through a suitable packing washer 99, which is press fitted into a recess 100 formed in the undersurface of the guide member 96, and serves as a closure for packing 102 secured in this recess. The provision of packing in the recess is optional, this structure being provided for use when the lower housing 66 is employed as a valve housing cooperating with a valve member carried at the lower end of the stem 95 for closing off the flow of fuel through a manifold, such as the manifold 12, which construction is described in detail in the copending application of Oscar J. Leins, Serial No. 4,741, filed February 4, 1935, which became Patent No. 2,126,564 on August 9, 1938.

The stem member 95 of this embodiment of the invention carries, at its lower end, a projecting threaded stud portion 103, which is adapted to thread into a push button 104 which is mounted for axial reciprocatory movement within an extending boss 105 formed at the lower end of the housing 66. The push button 104 may be formed of insulating material, such as a molded phenol condensate product, or molded rubber, and is adapted to carry a suitable annular contact ring 106 at the upper end thereof, the ring 106 being provided with a frusto-conical surface adapted to have wiping engagement across contact members 107 for completing a circuit thereacross. A suitable insulating member 108 is carried at the lower end of the stem 95 about the stud 103, and is interiorly recessed in its top surface, as shown at 109, for the purpose of providing a seat for a spring member 110 biased between the member 108 and the lower surface of the washer member 99. This spring 110 normally urges the stem member 95 downwardly to move the armature 89 away from the ends of the legs 77 of the magnet, and, unless the magnet is energized, will result in moving the contact ring 106 downwardly out of engagement between contacts 107, thereby opening the circuit to a safety control valve, such as the control valve 13 of Figure 1.

The current generated by the thermocouple at the pilot tip is not sufficient to produce a sufficient energization of the magnet 76 to draw the armature upwardly from its lowermost position against the pressure of spring member 110, and the externally projecting push button 104 is therefore employed to provide for moving the member up to engage the armature 89 across the ends of the magnet. After the armature has once been engaged in this position, it is capable of being maintained thereacross by the energization of the magnet against the pressure of spring 110, and the member 106 therefore closes the circuit between contacts 107 as long as the magnet remains energized. The button 104 may be colored in any desired manner, so that by merely looking at the switch 36, the position of the button 104 will indicate the closed or opened position of the switch. It is to be noted that the safety switch 36 may be mounted in reverse position on the supporting plate without affecting its operation to any extent.

Referring now in detail to the switching members 107, these members are provided with substantially V-shaped tip ends adapted to have engagement with the frusto-conical surface of the member 106, whereby full wiping contact between the contact surfaces is effected. The members 107 are formed of resilient spring brass, or similar conducting material, and at their opposite ends are provided with offset portions adapted to be engaged by the squared head ends 112 of suitable sleeve members 113 which extend within an insulating sleeve 114 through the wall of the housing 66 and receive terminal screws 115 threading into the outer extending ends thereof. The terminal screws 115 carry terminal lugs 116, and a suitable insulating disc member 117 is preferably interposed about the ends of the sleeves 113 and against the outer surface of the housing 66. Suitable washers 118 may also be provided on the outer surface of the insulating strip 117, being clamped in position about the sleeves 113 by the spun over extending ends of the sleeves.

The head ends 112 of the terminal sleeves 113 are preferably polygonal in shape, and bear against the offset ends of the members 107 and at their lower ends across the normally extending portion 119 of an insulating strip member or members 120 which are preferably L-shaped. In the assembly of the structure shown, the sleeves 113 are inserted from the interior of the housing 66 through suitable openings formed in the lateral surface of the housing, with the insulating members 120 disposed in position, the sleeves passing through suitable openings in the offset ends of the contacts 107, and projecting outwardly through openings in the insulating strip 117 and the washers 118. The projecting ends of the sleeves 113 are then spun over to clamp the same tightly in position, thereby clamping the contacts 107 in position, and clamping the insulating strips 120 in position. The inner portion of the sleeves are threaded to receive the terminal screws 115. Thus the terminal screws 115 may be readily removed from the sleeves 113, without, however, disturbing the relatively fixed assembly of the contacts 107 and the various insulating members for insulating these contacts from the housing 66.

It is therefore believed apparent that we have provided a thermo-electric safety switch construction which comprises a unit having a pilot tip, a thermocouple junction carried within the pilot tip, a lighter conduit for lighting the pilot tip from a remote point, including an external push button lighter, and a safety switch or valve responsive to the heat of the pilot flame for controlling the flow of fuel to a main burner.

We are aware that various changes can be made in certain details of construction of the elements comprising our structure, and we do not therefore intend to limit ourselves to the exact details of construction which have been shown and described, but only in so far as defined by the scope and spirit of the appended claims.

We claim:

1. In combination, a control device comprising a first housing having an opening therein, a cup-shaped housing secured to said first housing over said opening, a magnet member secured inside said cup-shaped housing and having pole means, electromagnetic coil means wound about the pole means of said magnet member, a reciprocatory plunger disposed substantially concentrically of said cup-shaped housing and having an armature having relative movement thereon for accommodating itself to the pole means of the magnet member, electric switch means in said first housing and cooperating with said plunger, means closing the open end of said cup-shaped housing and guiding the plunger in the movement of the armature toward and away from the pole means of said magnet member, spring means substantially coaxial with said plunger and disposed within said first housing and normally urging said armature to retracted position away from said magnet member and said switch means to open position, and means projecting from said first housing and adapted to be pushed manually to overcome said spring means and to return said armature to the position in which it is held by said magnet member.

2. In combination, a control device comprising a first housing having an opening therein, a cup-shaped housing secured to said first housing over said opening, a magnet member secured inside said cup-shaped housing and having pole means, electromagnetic coil means wound about the pole means of said magnet member, a reciprocatory plunger disposed substantially concentrically of said cup-shaped housing and having an armature having relative movement thereon for accommodating itself to the pole means of the magnet member, said armature being disposed wholly beyond one end of said coil means and being adapted to be held in attracted position by said magnet member, an electric circuit electrically independent of said armature and having a relatively weak source of current connected thereto, switch means in said first housing and connected to said plunger, means closing the open end of said cup-shaped housing and guiding the plunger in the movement of the armature toward and away from the pole means of said magnet member, spring means substantially coaxial with said plunger and disposed within said first housing and normally urging said armature to retracted position away from said magnet member and said switch means to open position, and means projecting from said first housing and adapted to be pushed manually to overcome said spring means and to return said armature to the position in which it is held by said magnet member and said switch means to closed position.

3. In combination, a control device comprising a first housing having an opening therein, a cup-shaped housing secured to said first housing over said opening, a U-shaped magnet member having its base portion secured inside said cup-shaped housing at one end thereof and having pole means extending from the supported base portion of the magnet member, electromagnetic coil means wound about the pole means of said magnet member, a reciprocatory plunger disposed substantially concentrically of said cup-shaped housing and having an armature having relative movement thereon for accommodating itself to the pole means of the magnet member, said armature being adapted to be held in attracted position by said magnet member, a pair of spring contacts in said first housing, a contactor carried by said plunger and cooperable with said switch contacts, means closing the open end of said cup-shaped housing and guiding the plunger in the movement of the armature toward and away from the pole means of said magnet member, spring means substantially coaxial with said plunger and disposed within said first housing and normally urging said armature to retracted position away from said magnet member and said contactor to open position separated from said contacts, and means projecting from said first housing and adapted to be pushed manually to overcome said spring means and to return said armature to the position in which it is held by said magnet member, said contactor having a tapered portion and said switch contacts having tapered portions cooperating with the tapered portion of said contactor to impart axial thrust to said plunger in a direction to separate said contactor from said switch contacts.

JOHN H. THORNBERY.
HAROLD A. MANTZ.